United States Patent [19]

Nakahara

[11] Patent Number: 5,701,425
[45] Date of Patent: Dec. 23, 1997

[54] DATA PROCESSOR WITH FUNCTIONAL REGISTER AND DATA PROCESSING METHOD

[75] Inventor: Shigeru Nakahara, Ohme, Japan

[73] Assignee: Hitachi, Ltd., Tokyo, Japan

[21] Appl. No.: 704,362

[22] Filed: Aug. 28, 1996

Related U.S. Application Data

[63] Continuation of Ser. No. 115,207, Sep. 1, 1993, abandoned.

[30] Foreign Application Priority Data

Sep. 21, 1992 [JP] Japan .................. 4-276665

[51] Int. Cl.$^6$ ............................................. G06F 1/04
[52] U.S. Cl. ............................................. 395/376; 395/595
[58] Field of Search ............................ 395/376, 384, 395/595

[56] References Cited

U.S. PATENT DOCUMENTS

| | | | |
|---|---|---|---|
| 3,646,522 | 2/1972 | Furman et al. | 340/172.5 |
| 3,786,436 | 1/1974 | Zelinski et al. | 340/172.5 |
| 3,969,724 | 7/1976 | Anderson et al. | 340/172.5 |
| 4,093,984 | 6/1978 | Ono . | |
| 4,128,873 | 12/1978 | Lamiaux | 395/325 |
| 4,283,713 | 8/1981 | Philipp | 340/347 |

OTHER PUBLICATIONS

Khan, Ashis. "Newly–Developed 64–Bit R4000—A Super-pipeline Structure with Improved Performance," Nikkei Electronics, No. 538, Oct. 14, 1991, pp. 171–185. (Provided in Japanese with English translation).

Dannenberg, David. "A Microprocessor that Executes Three Instructions in Parallel Using Superscalar Technology for Embedded Systems—A Microprocessor Employing Super Computer Technology," Nikkei Electronics, No. 490, Jan. 8, 1990, pp. 177–186. (Provided in Japanese with English translation).

Tanksalvala, Darius, et al. Part 2 CMOS, "High Speed Devices—CMOS, RISC, MPU," Nikkei Microdevices, Sep. 1990, pp. 50–55. (Provided in Japanese with English translation).

Primary Examiner—Jack B. Harvey
Assistant Examiner—Paul R. Myers
Attorney, Agent, or Firm—Fay Sharpe Beall Fagan Minnich & McKee

[57] ABSTRACT

A data processor has a functional register which subjects data written thereto and reads therefrom, to predefined operations. The functional register is specified in an instruction so that the data can be processed in various manners by combining the processing of an instruction specified by its operation code and a specific function allocated to the functional register.

24 Claims, 16 Drawing Sheets

FIG. 1

(1) Operating read data Register
   if read data is read from Reg[R]
      {read data ←Fr(i)(Reg[R])} andor {Reg[R]←Fr(i)(Reg[R])};

Fr(i) : OPERATOR INHERENT IN REGISTER R USING THE VALUE OF A SPECIFIC FIELD OF AN i-TH INSTRUCTION AS ITS PARAMETER (2) Operating write data Register
   if write data is written to Reg[W]
      Reg[W] ←Fw(i)(Reg[W]);

Fw(i) : OPERATOR INHERENT IN REGISTER W USING THE VALUE OF A SPECIFIC FIELD OF AN i-TH INSTRUCTION AS ITS PARAMETER

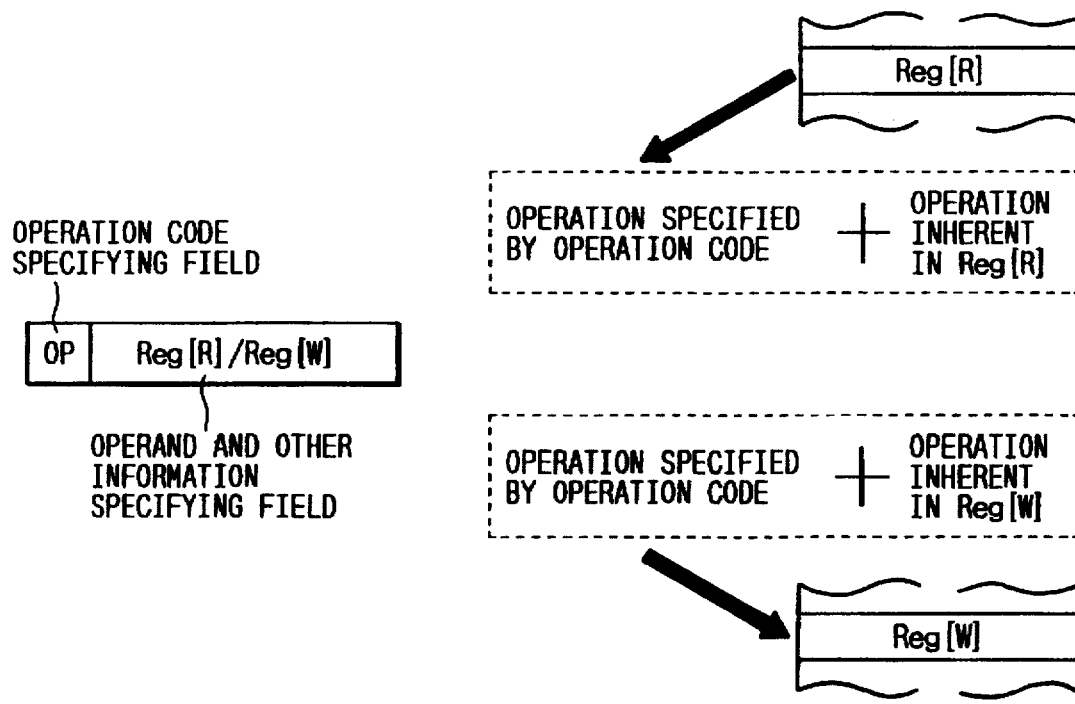

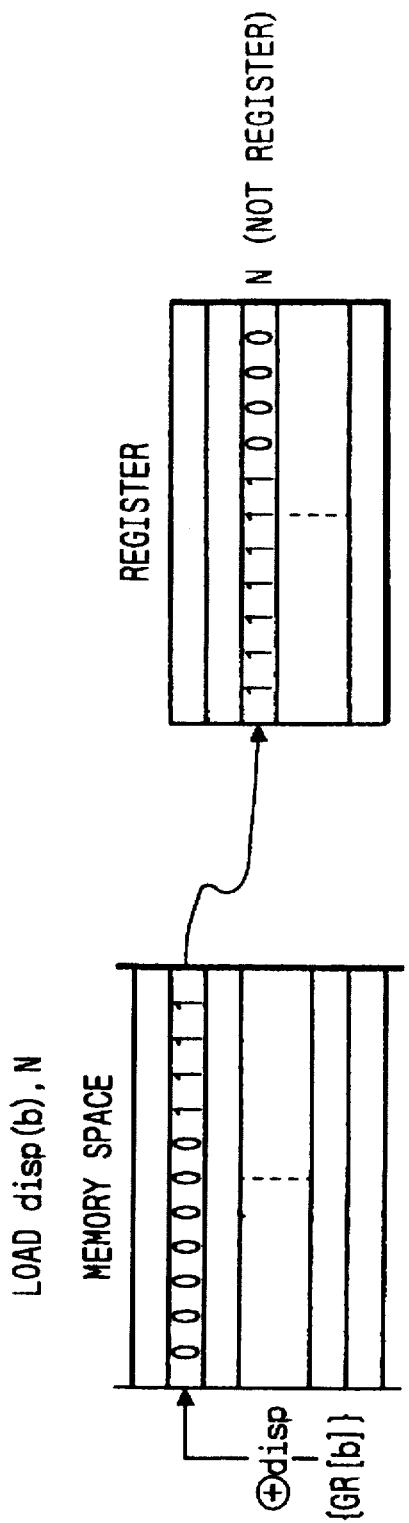

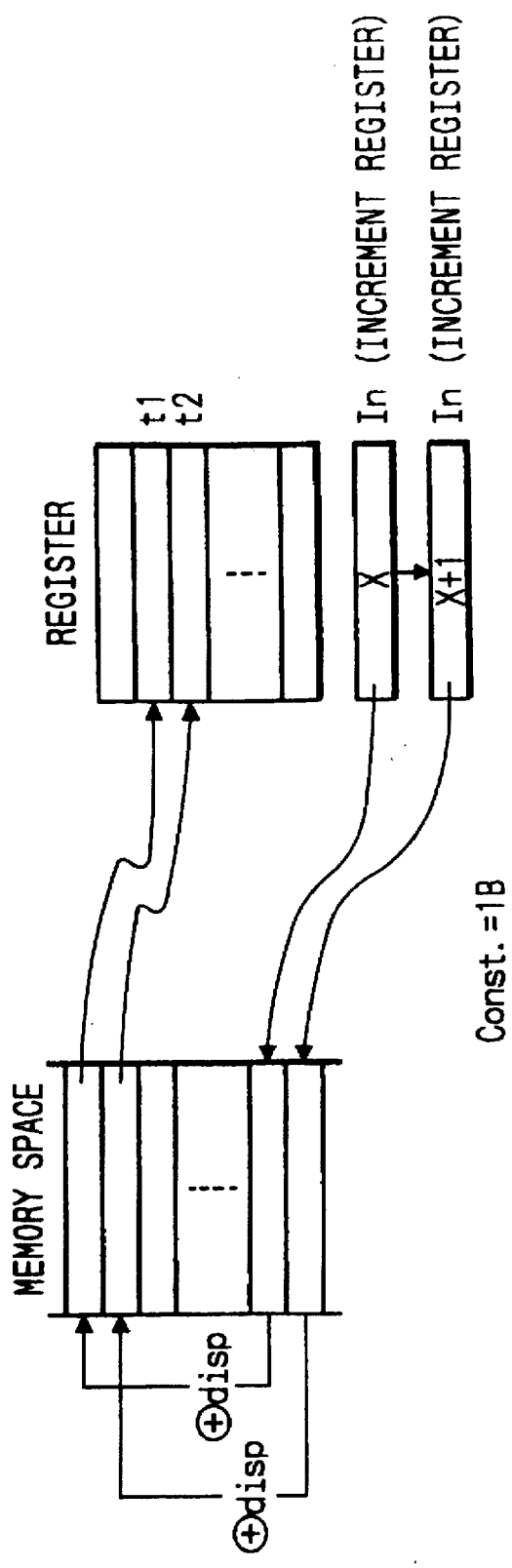

3. MODIFIED REGISTER

DEFINITION  if read data is read from Reg[M] {
  if disp.(i)<0
    read data←Reg[M];
  else
    read data←Reg[M]-disp;
}
Reg[M]←Reg[M]+disp.(i);

APPLICATION  ① LOAD disp(M), t2
             ② LOAD disp(M), t1

4. MODIFIED INDEX REGISTER
   DEFINITION if read data is read from Reg[Mi]:
   Reg[Mi]←Reg[Mi]+Reg[r](i);

5. ALIGNMENT REGISTER
   DEFINITION if write data is written to Reg[AL](i)
   Reg[AL]←write data & maskpattern(AL(i));

APPLICATION 1
   LOAD disp(b),AL0

6. CARRY/BORROW REGISTER

DEFINITION   if write data is written to Reg[C/B]
              Reg[C/B]←write data+PSW[C/B];

APPLICATION

ADD a, b, C/B

7. SHIFTED REGISTER

DEFINITION  if read data is read from Reg[ni]
            read data←shift(Reg[ni],i);

APPLICATION

ADD n2,b,t

FIG. 16

| | WITHOUT FUNCTIONAL REGISTER | WITH FUNCTIONAL REGISTER SUPPORTED |
|---|---|---|
| NO. OF BITS OF OPERATION CODE AREA | × | ○ |
| NO. OF BITS OF OPERAND AREA | ○ | △ |
| NO. OF BITS OF TARGET AREA | ○ | △ |
| LOGICAL SCALE OF OPERATION CODE DECODER | × | ○ |
| LOGICAL SCALE OF OPERAND DECODER | ○ | △ |
| LOGICAL SCALE OF TARGET DECODER | ○ | △ |

○ NO INCREASE
△ SMALL INCREASE
× LARGE INCREASE

DATA PROCESSOR WITH FUNCTIONAL REGISTER AND DATA PROCESSING METHOD

This is a continuation of U.S. application Ser. No. 08/115,207, filed Sep. 1, 1993, now abandoned.

BACKGROUND OF THE INVENTION

The present invention relates to a data processor and a data processing method capable of realizing highly functional processings using less steps while suppressing the increase in operation codes and, more particularly, to a technology which is effective if applied to a logical integrated circuit device such as a microcomputer.

The data processors of yon Neumann type are substantially identical in their fundamental constructions. For example, a data is processed by: loading an instruction control part sequentially with instructions stored in a cache memory or the like; decoding a bit area (the "operation code") to determine the steps to be executed, and; decoding an area specifying the data (the "operand") to be processed. These data processors are exemplified by the R4000 Chip of Mips (as described on pp. 171 to 185 of Nikkei Electronics No. 538 issued on Oct. 14, 1991 by Nikkei PB), 1960 Chip of Intel (as described on pp. 177 to 186 of Nikkei Electronics No. 490 issued on Jan. 8, 1990 by Nikkei PB) and PA-RISC Chip of Hewlett Packard (as described on pp. 50 to 55 of Nikkei Micro Device issued in September, 1990 by Nikkei PB).

On the other hand, the data processor can have its architecture roughly divided into a RISC (i.e., Reduced Instruction Set Computer) architecture for speeding up the processing and simplifying the hardware with a relatively simple instruction set and a CISC (i.e., Complex Instruction Set Computer) architecture such as the object-oriented architecture aimed at higher functions with a relatively complex instruction set. It is difficult to determine whether the architectures of the existing various data processors belong to the RISC or the CISC. However, the instruction can be deemed to belong to the CISC category if it has various addressing modes or if it is a complex instruction in which a plurality of operations are executed in response to one instruction.

SUMMARY OF THE INVENTION

In the aforementioned RISC-like data processor, the highly functional processings for the CISC-like data processor to execute with one instruction are executed by combining a plurality of instruction each for executing a fundamental and simple processing. Thus, the highly functional processings, although not frequent, cannot be efficiently executed by the RISC-like data processor. If, at this time, the diversified addressing modes or the CISC-like instruction such as the complex instruction for executing a plurality of operations with one instruction are to be added to the fundamental instruction set, the number of instructions to be supported by the hardware increases. As a result, the logical scale of a random logic such as the decoder of the instruction control part is enlarged to elongate the delay time of critical paths, that is, to drop the performance of the LSI chip and to increase the chip area and the schedule for developing the chip.

An object of the present invention is to provide a data processor and a data processing method capable of diversifying the functions while suppressing the increase in operation codes.

Another object of the present invention is to provide a data processor and a data processing method capable of realizing highly functional processings at less steps.

Still another object of the present invention is to provide a data processor capable of realizing a variety of functions while minimizing the increase in the hardware.

The foregoing and other objects and novel features of the present invention will become apparent from the following description to be made with reference to the accompanying drawings.

A representative of the invention to be disclosed will be summarized in the following.

Specifically, when a data is to be written to or read from a register, a function to subject the data to a specific processing is allocated in advance to a register (i.e., a functional register). This functional register is specified in an instruction so that the data to be read from or written to the functional register can be processed in various manners by combining the processing of an instruction specified by its operation code and a specific function owned by the specified functional register.

Thus, the data can be processed in various manners by combining the processing of an instruction specified by its operation code and a specific function owned by the functional register. As a result, the processings by the data processor can be diversified and given multiple functions without increasing the instruction number of the instruction set, i.e., without increasing the bit number of the operation code, so that the various functions can be realized by minimizing the increase in the hardware of the instruction control part represented by the decode logic of the operation code.

The aforementioned various functions to be realized are achieved by specifying the functional registers in the operand specifying area in one instruction, and the inherent functions allocated to the specified functional registers are executed at the time of writing and reading the data to and from the corresponding registers. As a result, the number of instructions to be executed is not increased as the functions are extended. This means that the highly functional processings can be realized at a smaller number of steps.

BRIEF DESCRIPTION OF THE DRAWING

FIG. 1 is a diagram for explaining definitions and functions of functional registers of a data processor according to the present invention;

FIG. 2 is a diagram for conceptionally explaining the C-language definition of a NOT register exemplifying the functional register and a processing example using the NOT register;

FIG. 3 is a diagram for conceptionally explaining the C-language definition of an increment register exemplifying the functional register and a processing example using the increment register;

FIG. 16 is an explanatory diagram showing the relations between an instruction format and a hardware.

DESCRIPTION OF THE PREFERRED EMBODIMENT

Figure 4:
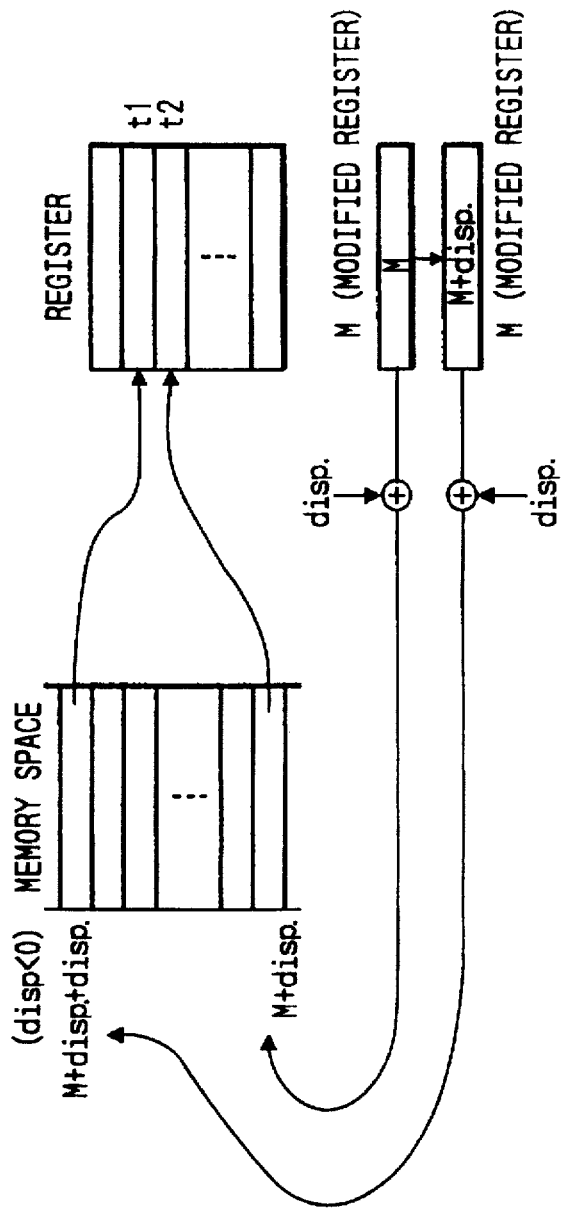
FIG. 4 is a diagram for conceptionally explaining the C-language definition of a modified register exemplifying tea functional register and a processing example using the modified register.

FIG. 1 is a diagram explaining definitions and functions of functional registers (as will be called the "operating registers") of a data processor according to the present invention. The operating registers in FIG. 1 are roughly classified into (1) operating read data register, Reg[R] and (2) operating write data register, Reg[W]. Contents of the operating read data register Reg[R] and subjects to a pre-defined operation Fr(i) using the value of a specific field of the i-th instruction, the result of the operation being read and/or written to the Reg[R].

Write data of the operating write read data register Reg [W] is subjected to a pre-defined operation Fw(i) using the value of a specific field of the i-th instruction, the result of which is written the Reg[W].

The operating registers Reg[R] and Reg[W] can be specified in the instruction as shown in FIG. 1. The instruction has an operation code specifying field along with an operand and other information specifying field. The operating code specifying field has a description of an operation code (e.g., an instruction code LOAD or ADD) OP prepared according to the architecture of the data processor. The operand and other information specifying field has a description of an operand necessary for executing an instruction in accordance with the operation code. The operating registers Reg[R] and Reg[W] are specified in the aforementioned operand and other information specifying field.

When the operating read register Reg[R] having the pre-defined function allocated thereto is specified in the instruction, the processing (or operation) specified in the operation code of the instruction and the processing predefined to the operating read data register Reg[R] are executed making use of the information latched in the operating read data register Reg[R]. For example, the operating register Reg[R] specified in the instruction has its latched value subjected to the pre-defined operation of the register and the result of which is provided for processing allocated by the operation code. After availability for processing specified by the operation code, it is possible to additionally execute processing, if necessary, for writing the delivered read data to the operating register Reg[R].

On the other hand, when the operating write data register Reg[W] having a pre-defined function allocated thereto is specified in an instruction, the processing specified in the operation code and the processing pre-defined for the operating write data Reg[W], are executed, and the result is stored in the operating write data register Reg[W]. For example, the data specified to be written to the operating register Reg[W], as specified in the instruction, in the operation code of the instruction is subjected to the pre-defined operation for the operating register Reg[W], and the result is written to the operating register Reg[W].

The individually pre-defined operations for the operating read data register Reg[R] and the operating write data register Reg[W], are executed at the time of reading or writing the data for the corresponding registers.

Since the operation code is accompanied by designations of the operating registers Reg[R] and Reg[W], the tasks to be realized by the same operation code, i.e., one kind of instruction, can be diversified without increasing the kinds of operation codes so that tasks similar to highly functional instructions can be supported without increasing the number of instructions and the logical scale of the instruction control unit. In other words, in the data processor, dedicated operation codes for highly functional instructions the number of instructions and the logical scale of the instruction control unit can be decreased without reducing the functions of the data processor.

Next, specific examples of the aforementioned operating registers and processing examples using the operating registers will be described by noting the data flows between the memories and the registers with reference to FIGS. 2 to 8.

FIG. 2 conceptionally illustrates the C-language definition of a NOT functional register and a processing example thereof. The NOT register N belongs to the same category of the aforementioned operating write data register Reg[W]. Write data is written to the (Reg[N]) after inversion of the individual bit values of the write data. In the same Figure, there is also illustrated the LOAD instruction "LOAD disp (b),N" designating the NOT register N. In this instruction, the NOT register N is specified as the destination. If this instruction is executed, the data stored at a memory address, which is obtained by adding a displacement (disp) to a value (i.e., base address) preset in a general purpose register b {GR[b]}, is written to the NOT register N. Then, the bits of the data are inverted in accordance with the pre-defined function of the NOT register. As a result, by designating the NOT register N in the instruction "LOAD disp(b),N", as shown, writing the write data to the NOT register N and the bit inversion thereof can be executed by one instruction (i.e., LOAD instruction).

FIG. 3 conceptionally illustrates the C-language definition of an increment functional register and a processing example thereof. The increment functional register IN (Reg[In]) belongs to the same category of the aforementioned operating read data register Reg[R]. The content of the increment functional register is increased, when the data of the increment register In (Reg[In]) is to be read. The increased content is written back to the increment register In (Reg[In]). In the same Figure, the increment register In is designed in the base addresses of LOAD instructions ① and ②. In this application, the increment register In base address is automatically incremented each time data is written from the memory to the register, so that the steps of reading the data of consecutive memory areas can be executed using the ordinary LOAD instruction.

FIG. 4 conceptionally illustrates the C-language definition of a modified functional register and a processing example thereof. The modified functional register M (Reg[M]) belongs to the same category of the aforementioned operating read data register Reg[R]. Here the read data is set to the value latched by the modified register M (Reg[M]) when the displacement (disp) of the i-th instruction is negative. Otherwise its read data is set the difference of the value of the modified register M (Reg[M]) and the displacement. At each read, moreover, the addition of the displacement and content of the modified register M (Reg[M]) is written back to the modified register M (Reg[M]). In the same Figure, there is shown an application in which the modified register M (Reg[M]) is designated in the base address in the LOAD instruction. In this application, the displacement is negative. In accordance with the aforementioned definition, the read data becomes the value of the modified register M. The memory access address at this time takes the sum (Reg[M] +disp), the value of the modified register M and the displacement (disp). In the execution of this instruction, therefore, the register t2 is loaded with the data from the memory address (Reg[M]+disp). Although a specific example of the application in which the displacement (disp) is positive is not illustrated, the read data is a difference the value of the modified register M and the displacement (disp). As a result, the memory access address takes a value (Reg[M]−disp+disp). As a result, the post-increment and pre-decrement for pushing/popping the stack or FiFo (i.e., First-in First-out) can be addressed using the ordinary LOAD instruction. In case of the LOAD instruction ②, the value of the modified register M is changed to (M+disp) as a result of the previous instruction ①. Thus, the memory access address takes the value (M+disp+disp) at the time of executing the LOAD instruction ②.

Figure 5:
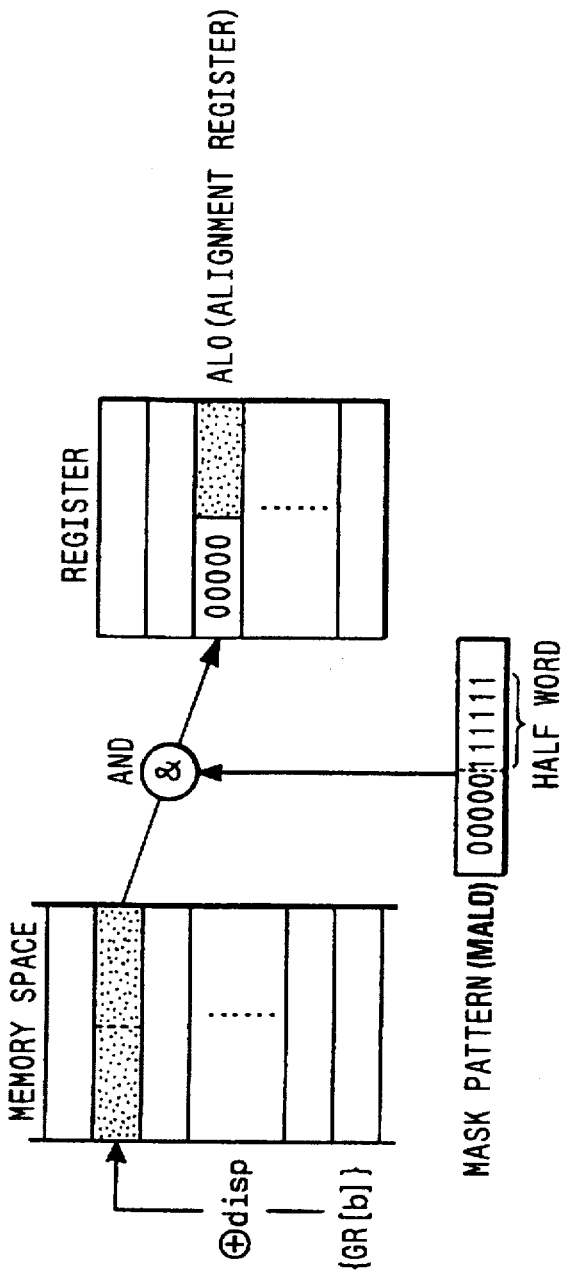
FIG. 5 is a diagram for conceptionally explaining the C-language definitions of a modified index register and an alignment register exemplifying the functional register and a processing example using the alignment register.
Figure 6:
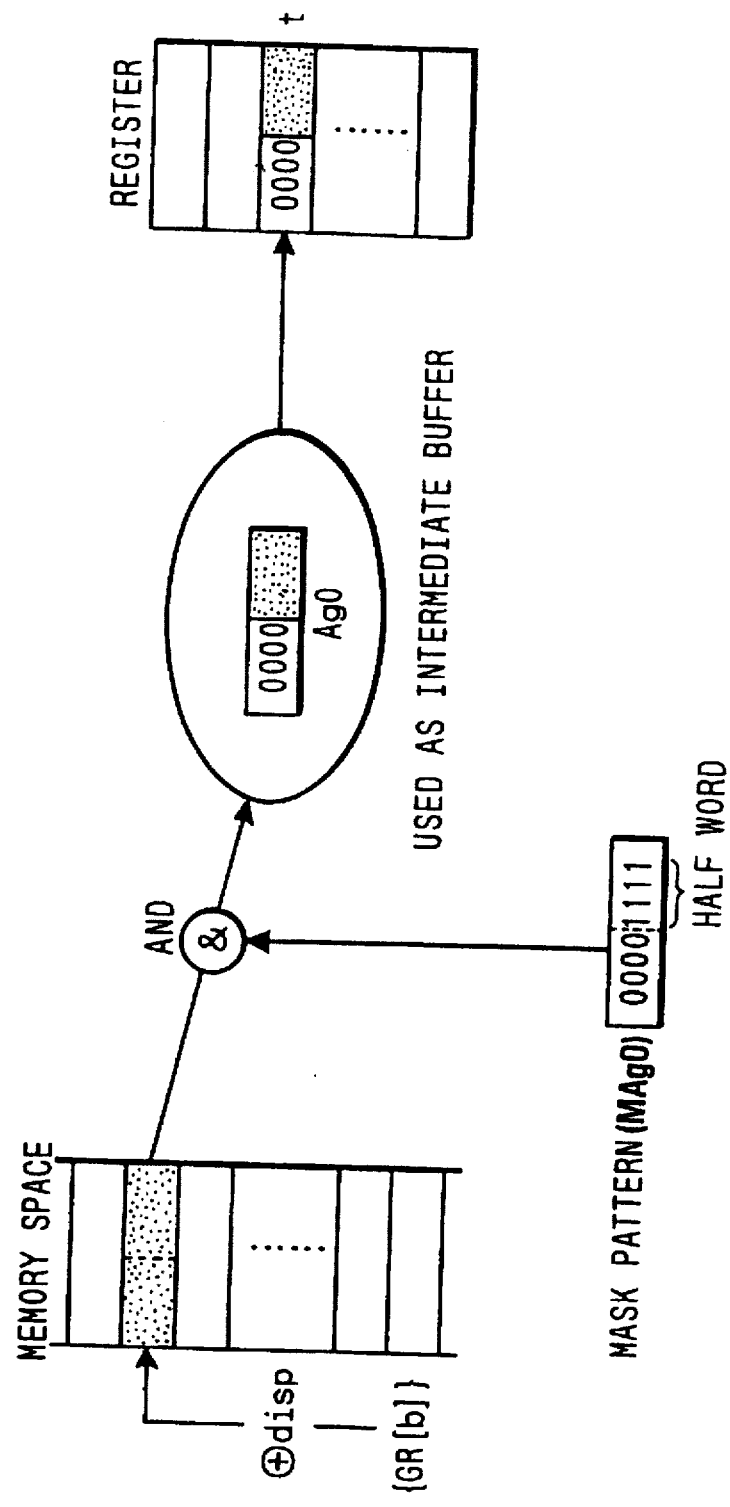
FIG. 6 is a diagram for explaining another processing example using the alignment register.

FIG. 5 illustrates the C-language definition of a modified index register. This modified index register Mi (Reg[Mi]) uses the value of the register Reg[r] specified by the i-th instruction as an increment constant. Where the modified index register Mi (Reg[Mi]) is used in the application of FIG. 3, the base address can be increased at an arbitrary value (set in the Reg[r]) by presetting a suitable value in the Reg[r] (or by loading the Reg[r] with a predetermined suitable value in response to another LOAD instruction).

FIG. 5 conceptionally illustrates the C-language definition of an alignment functional register and an application thereof. This alignment register AL (Reg[AL]) belongs to the same category of the aforementioned operating write data register Reg[W]. The alignment register logically ANDs the mask pattern specified by an index with the write data of the alignment register AL (Reg[AL]). The AND data is written to the alignment register AL (Reg[AL]). If all of the more significant half words of the mask pattern (MAL0) are defined to 0 and all of the less significant half words are defined to 1, as in and application 1, the alignment register AL0, the alignment register specified as the destination of the LOAD instruction, is written at its less significant half words with the value of the corresponding bit of the memory and at its more significant half words with the value of the corresponding bit of the memory. This specified alignment register can also be used as an intermediate buffer for writing data to a register t, as in the application 2 illustrated in FIG. 6. The intermediate buffer is designated Ag0 whereas the mask pattern is designated (MAg0) in FIG. 6. By designating the alignment register as the allocation (or the intermediate buffer) of the write data, as illustrated in the applications 1 and 2, the steps of ANDing the write data and the mask pattern, and the writing the results to the alignment register (or the register t) can be executed by one instruction (i.e., the LOAD instruction). The mask pattern corresponds to the alignment register, although not especially limited thereto. For example, the aforementioned mask pattern (MAL0) corresponds to the alignment register AL0, and the aforementioned mask pattern (MAg0) corresponds to the alignment register Ag0. On the other hand, the memory access address is obtained by summing the value of the general-purpose register {GR[b]} and the displacement (disp).

Figure 7:
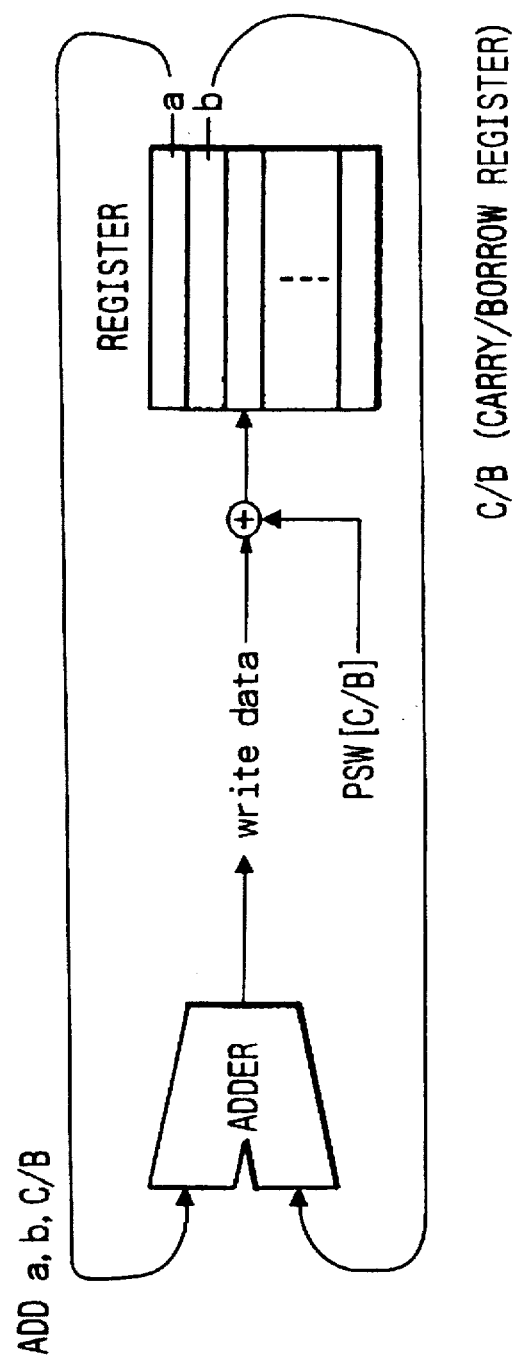
FIG. 7 is a diagram for conceptionally explaining the C-language definition of a carry/borrow register exemplifying the functional register and a processing example using the carry/borrow register.

FIG. 7 conceptionally illustrates the C-language definition of a carry/borrow functional register and an application thereof. This carry/borrow register C/B (Reg[C/B]) belongs to the same category as the aforementioned operating write data register Reg[W]. This register C/B (Reg[C/B]) adds the bit indicating the carry/borrow of a program status word PSW, i.e., the value of the PSW[C/B], to the write data and writes the added value to the carry/borrow register C/B (Reg[C/B]). By designating the destination of the add-subtract instruction (e.g., the ADD instruction) to the carry/borrow register C/B, as in the application, the carry/borrow value PSW[C/B] obtained by the previous operation can be added to the added-subtracted results of the two registers a and b by executing one instruction.

Figure 8:
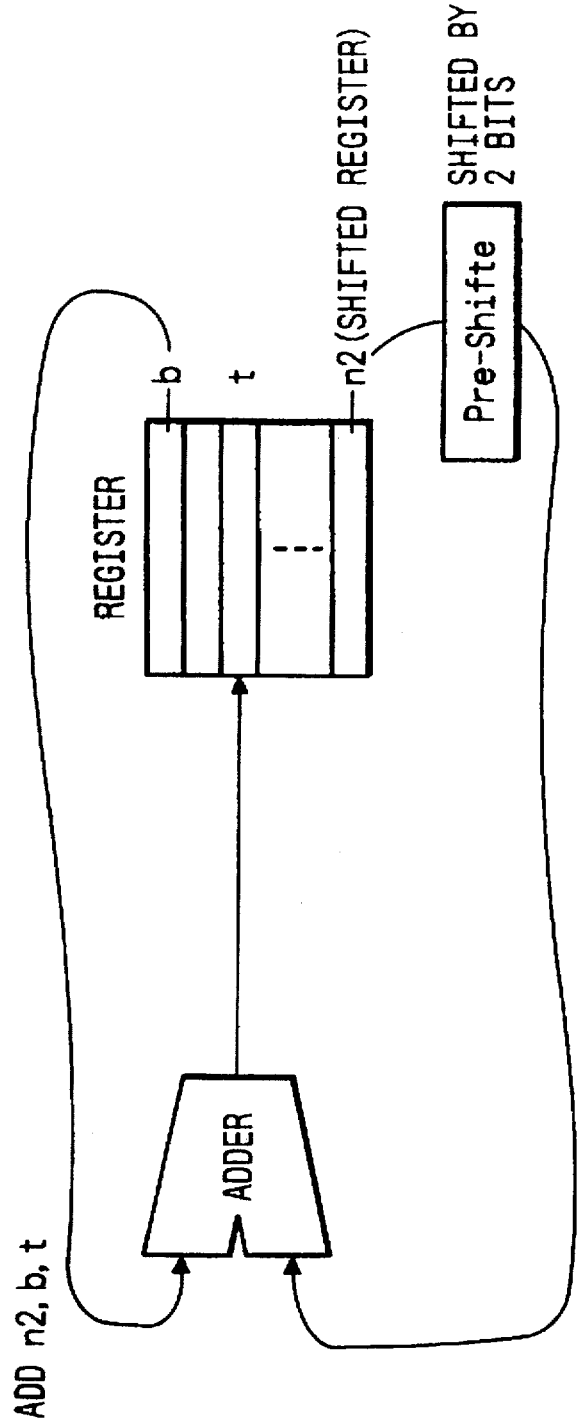
FIG. 8 is a diagram for conceptionally explaining the C-language definition of a shifted register exemplifying the functional register and a processing example using the shifted register.

FIG. 8 conceptionally illustrates the C-language definition of a shifted functional register Reg[ni] and an application thereof. This shifted register ni (Reg[ni]) belongs to the same category as the aforementioned operating read data register Reg[R], and shifts the content of the shifted register ni (Reg[ni]) leftward by i-bits and outputs the shifted content as the read data. In the application of the same Figure, an ADD instruction is illustrated. If this instruction is executed, the data read from the shifted register n2 is shifted in a predetermined direction (i.e., leftward by 2 bits) and added to the value of the register b. The added result is written to the register t of the destination.

Figure 9:
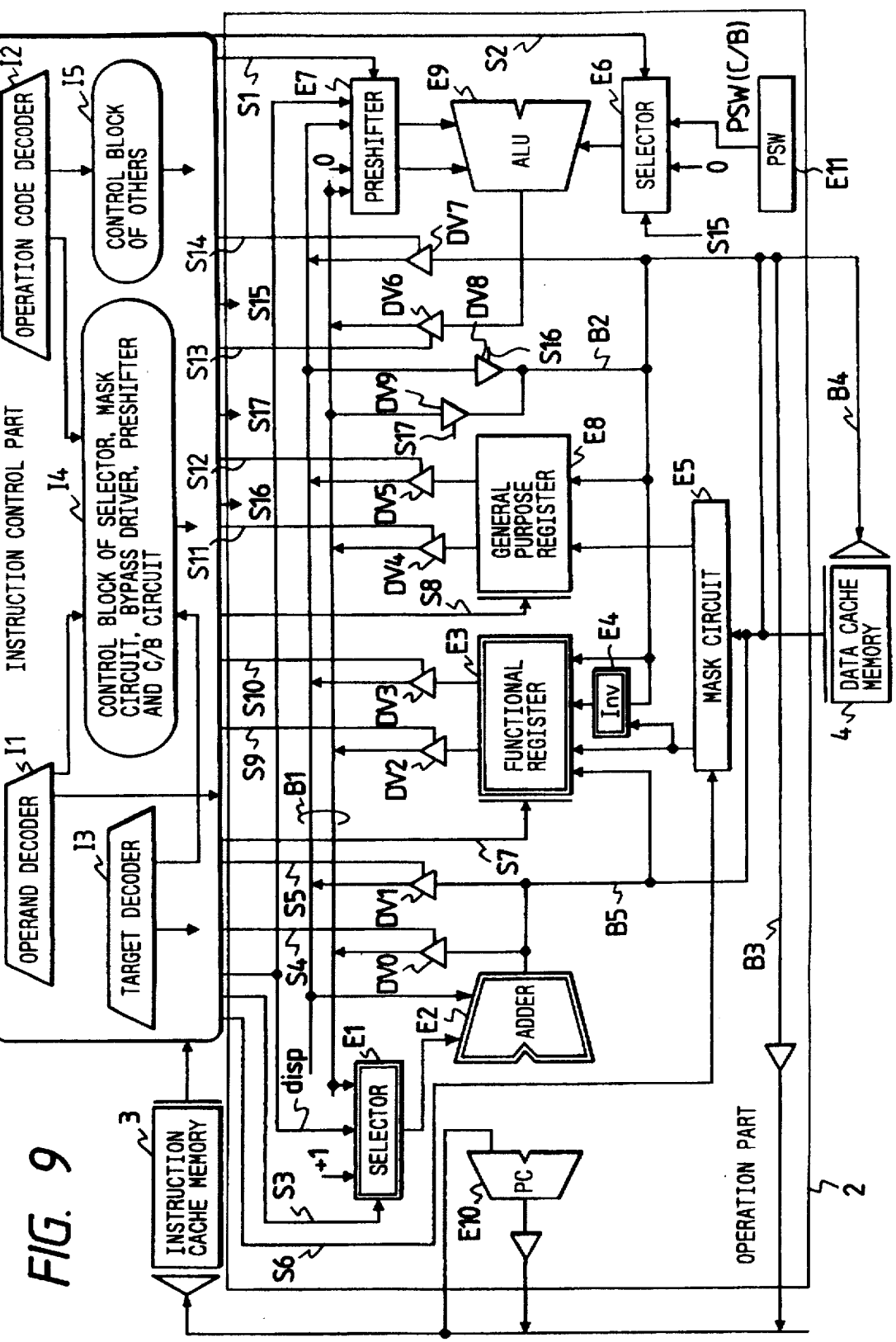
FIG. 9 is a block diagram showing one embodiment of the data processor using the functional register explained in FIGS. 2 to 8.

FIG. 9 is a block diagram showing one embodiment of the data processor using the functional registers which have been described with reference to FIGS. 2 to 8. The data processor, is formed on a single semiconductor substrate by the well-known semiconductor integrated circuit manufacturing technology and is illustrated to include: an instruction control part 1; an operation part 2; an instruction cache memory 3; and a data cache memory 4.

Reference character E3 appearing in the operation part 2 of the same Figure designates a set (as will be shortly referred to as the "functional register") of the various functional registers described with reference to FIGS. 2 to 8. The operation part 2 is equipped with a selector E1, an adder E2 and an inverter E4 dedicated to realize the functions of the functional register E3, although not especially limited thereto. A mask circuit E5, a selector E6 and a preshifter E7 are disposed in the data processor and used for realizing the functions of the functional register E3. The operation part 2 is additionally equipped with: a plurality of general purpose registers E8; a program counter (PC) E10; an arithmetic logic unit (ALU) E9; and a processor status word register (PSW) E11 for latching the carry or borrow value PSW [C/B]. Characters B1, B2, B3 and B4 designate internal buses, and characters DV0 to DV9 designate bypass drivers. Moreover, there are alignment registers AL0 and AL1 (not shown) in the functional registers so that the mask patterns of the mask circuit are controlled in a manner to correspond to the individual alignment registers using a later-described control signal S6.

The instruction control part 1 decodes the instruction fetched from the instruction cache memory 3 and feeds a variety of control signals S1 to S17 to the operation part 2. The instruction control part 1 includes an operand decoder I1, an operation code decoder I2, a target decoder I3 and control blocks I4 and I5. The operation decoder I2 decodes the operation code contained in the instruction. The other fields of the instruction are fed to the operand decoder I1 and the target decoder I3 in accordance with the operation codes, although not especially limited thereto. The operand decoder I1 decodes the operand or source designating area of the instruction, for example. Where the aforementioned operation read data register Reg[R] is specified, its designation is decoded. The target decoder I3 decodes the destination or target specifying area of the instruction. Where the aforementioned operation write data register Reg[W] is specified, its designation is decoded. The decoded results of the operand decoder I1 and the target decoder I3 are utilized to specify the general purpose register E8 and the functional register E3. Moreover, the decoded results of the operand decoder I1 and the target decoder I3 are also fed together with the decoded result of the operation code decoder to the control block I4 and utilized to control the selector E1, the mask circuit E5, the preshifter E7 and their carry/borrow, and the bypassing drivers DV0 to DV9.

Figure 10:
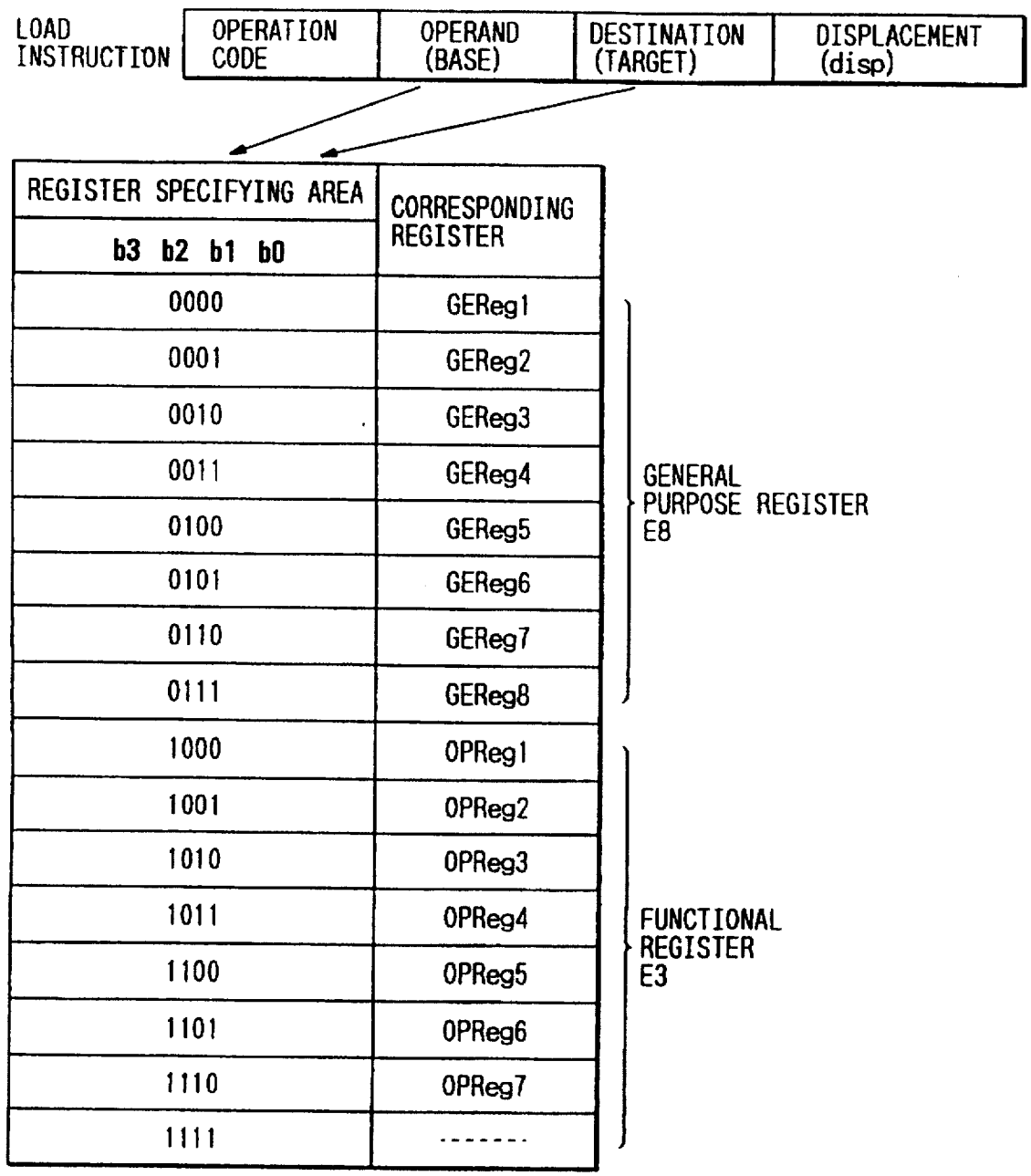
FIG. 10 is an explanatory diagram showing a specifying method the functional register and a general purpose register.

A method of specifying the general purpose register E8 and the functional register E3 will be described with reference to FIG. 3. Both of these registers are specified by the operand fields in the instruction. The kind of the operation code specific what area of the instruction, i.e., what bits of the instruction, is to be utilized as the specifying field. The LOAD instruction has the fields of operation code, operand, destination and displacement (disp), for example, as shown in FIG. 10. The register is specified by the operand or destination area. If the number of registers contained in the general purpose register E8 and the functional register E3 equal $2^n$, for example, the register numbers can be sequentially specified with n bits. On the other hand, if the general purpose register E8 contains eight general purpose registers GEReg1 to GEReg8 and if the functional register E8 contains seven functional registers OPReg1 to OPReg7, for example, as shown in FIG. 10, the individual registers can be designated with the numbers specified by 4 bits b3, b2, b1 and b0, as shown. With the specification, the value "0" for the most significant bit b3 specifies the general purpose register E8. The value "1" of the most significant bit b3 specifies the functional register E3. With these allocations of the register numbers, therefore, the register specifying area in the instruction format contains the bit field (b3) for specifying which of the general purpose register or the functional register is to be specified.

The instruction at the address specified by the program counter E10 is read from the instruction cache memory 3 and sent to the instruction control part 1. This instruction control part 1 decodes the operation code and the operand in the instruction and controls the operation part 2 with the various control signals according to the decoded results.

Figure 11:
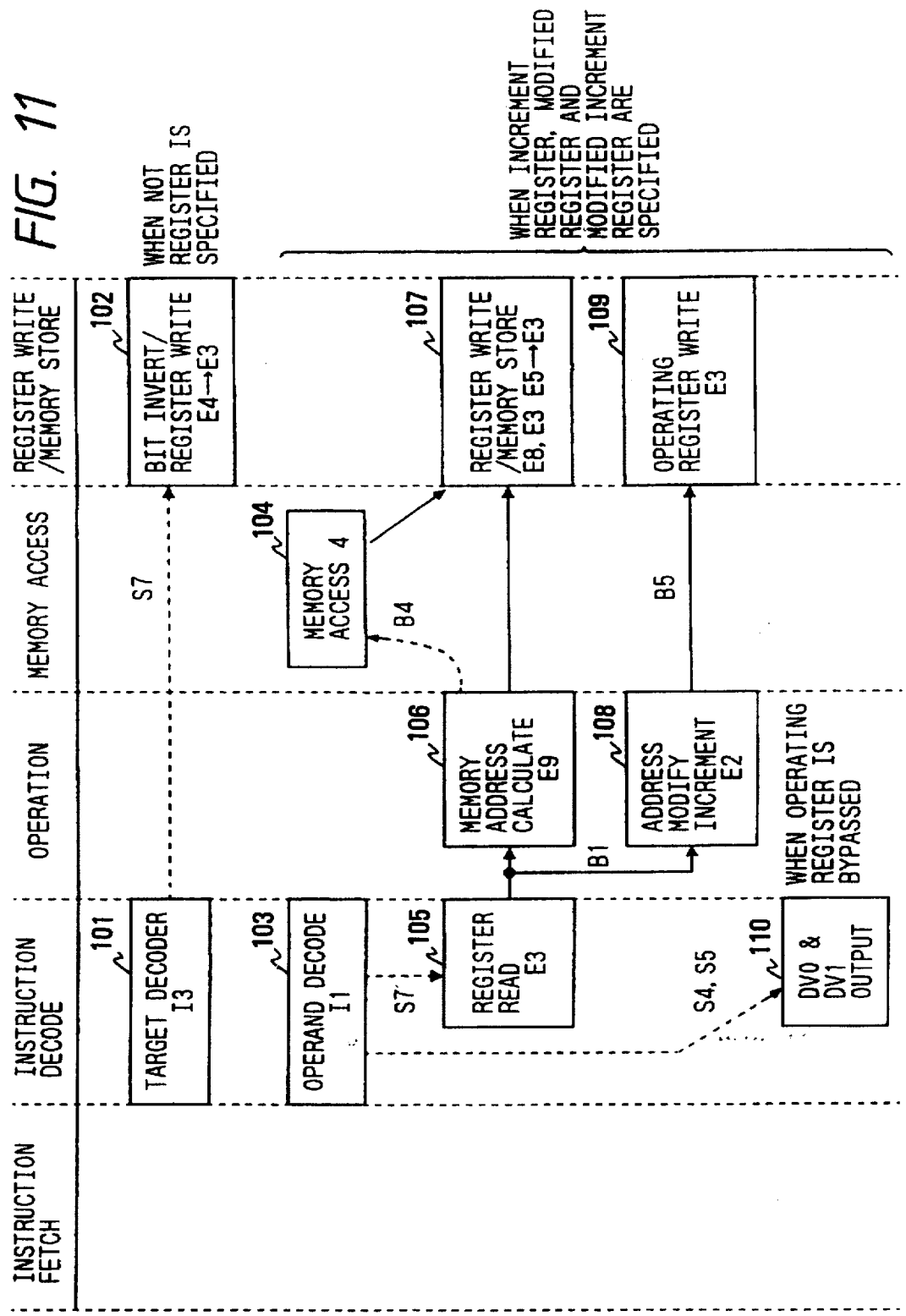
FIG. 11 is an explanatory diagram showing one example of the control method, by which the operation of a functional register is to be executed according to the construction of FIG. 9, in a pipe line form.
Figure 12:
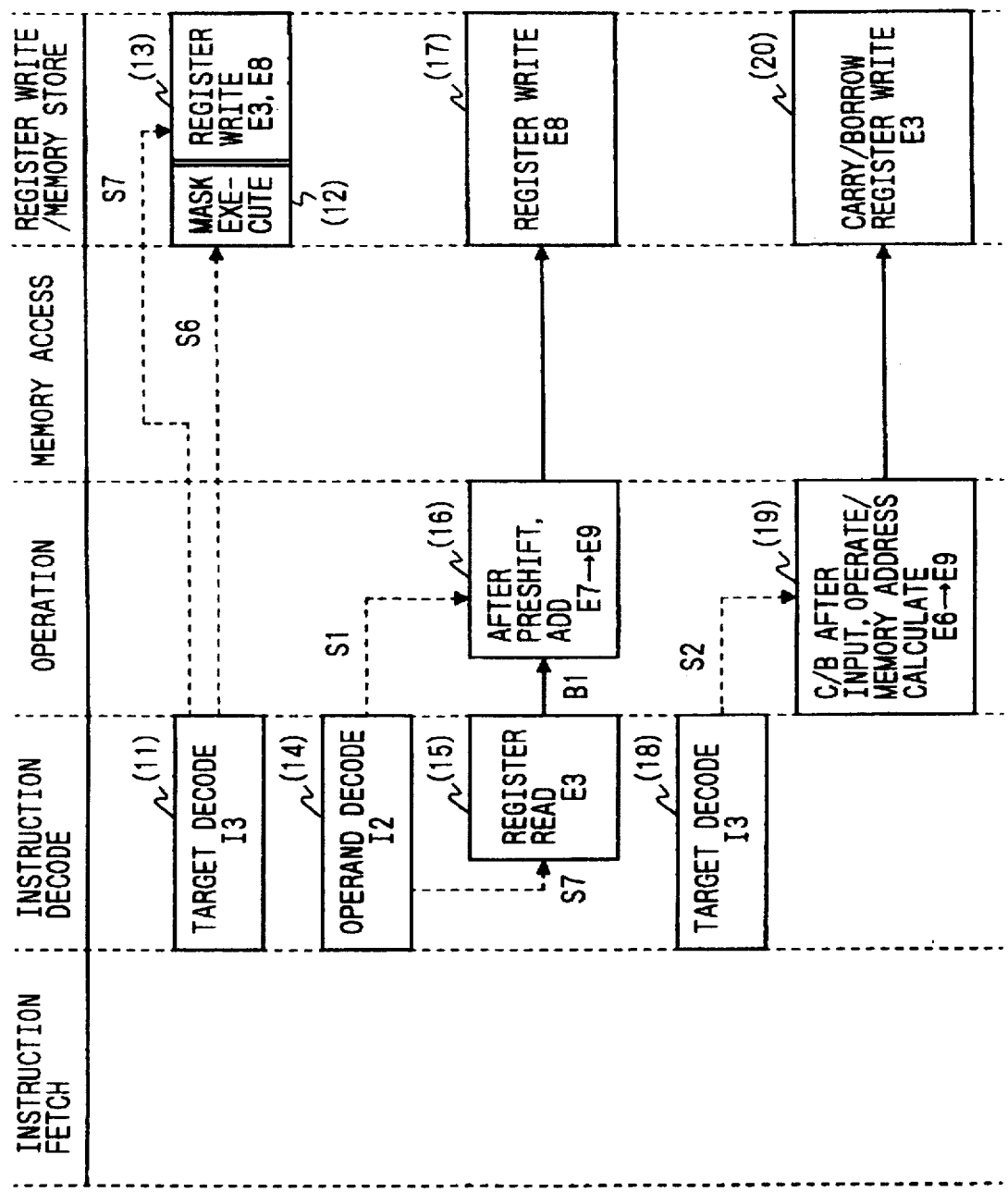
FIG. 12 is an explanatory diagram showing one example of the control method, by which the operation of another functional register separate from that of FIG. 11 is to be executed according to the construction of FIG. 9, in a pipe line form.

FIGS. 11 and 12 are explanatory diagrams showing the control modes in which the pre-defined operations allocated to the various functional registers, discussed with reference to FIGS. 2 to 8, are to be executed in a pipe line form. The Pipe line processing stages, as shown in the same Figures, are composed of the instruction fetch, instruction decode, operation, memory access and register write/memory store. These stages indicate what processing is to be executed individually for the specifications of the functional registers. In the same Figures, the solid arrows indicate the flow of data, and the broken arrows indicate the flow of the asserted control signals or address signals. Moreover, the characters attached to the signals and the characters in the blocks correspond to those shown in FIG. 9. One example of the operations allocated to the individual functional registers described with reference to FIGS. 2 to 8, will be described with reference to the construction of FIG. 9.

When the register number decoded by the target decoder I3 is the NOT register N, the bit value of either the data read from the data cache memory 4 or the data read from the internal bus B2 (as will be shortly referred to as the "write bus") is inverted by the inverter E4 at the register write/memory store stage, and is written in the NOT register N selected by the register select control signal S7 [as shown at (101) and (102) in FIG. 11].

When the register number decoded by the target decoder I3 is the alignment register AL0 or AL1, the mask pattern of the mask circuit E5 is selected based on the aforementioned decoded value by the control signal S6 outputted from the control block I4 [as shown at (11) in FIG. 12]. At the register write/memory store stage, moreover, an AND is taken by the mask circuit E5 between the read data of the data cache memory 4, the data read to the internal bus B4 (as will be shortly referred to as the "address bus") or the data read to the internal bus B5 (as will be shortly referred to as the "write bus") and the selected mask pattern. The AND data, i.e., the data having been subjected to the masking processing (as will be referred to as the "alignment processing") is written to the alignment register AL0 or AL1 selected by the register select control signal S7 [as shown at (13) in FIG. 12]. On the other hand, when the alignment register AL0 or AL1 is used as an intermediate buffer, as in the application 2 of FIG. 6, the data written to the alignment register AL0 or AL1 is further written, through the internal bus B1 (as will be shortly referred to as the "source bus") or B2 into another register such as a predetermined register in the general purpose register E8.

If the register number decoded by the operand decoder I1 indicates a register contained in the functional register E3 and if the register is the aforementioned shifted register (ni), the preshifter E7, controlled by the control signal S1, shifts the data by the bit number corresponding to i. Specifically, if the decoded operand specifies the shift register ni, as shown in FIG. 12, the data is read to the internal bus B1 from the shift register ni contained in the functional register E3 selected by the register select control signal S7 [as shown at (14) and (15) in FIG. 12]. At a subsequent operation stage, the preshifter E7 is controlled by the control signal S1 obtained after decoding the operand, to shift the aforementioned read data. The shifted data is processed according to the operation code of the instruction specifying that shifted register [as shown at (16) in FIG. 12]. In case of the application of FIG. 8, the shifted data is inputted to the arithmetic logic unit E9. At the operation stage, moreover, the data stored in the register b in the general purpose register E8 is added. The added result is stored in the register t in the general purpose register E8 at the register write/memory store stage [as shown at (16) and (17) in FIG. 12].

On the other hand, when the instruction decode stage indicates the increment register In, contained in the functional register E3, data is and read from that register, is sent through the internal bus B1 and the preshifter E7 to the arithmetic logic unit E9. The data is further through the internal bus B1 to the adder E2 [as shown at (103) and (105) in FIG. 11]. The other input of the adder E2 is selectively fed with a fixed value (+1) by the selector E1 in response to the operand decoder I1. As a result, the read value of the aforementioned increment register In is incremented by 1 at the operation stage [as shown at (108) in FIG. 11]. At the register write/memory store stage, moreover, the stored data is written again to the increment register In through the write bus B5 [as shown at (109) in FIG. 11]. When the value of the increment register In is used at a subsequent stage, it is detected by the control block I4, and the bypass driver DV0 or DV1 is enabled (to an open state) by asserting the control signal S4 or S5, to output added result of the adder E2 directly to the source bus B1 [as shown at (110) in FIG. 11]. In case of the application of FIG. 3, the arithmetic logic unit E9 is fed with not only the read data of the increment register In, but also the displacement disp through the preshifter E7. The arithmetic logic unit E9 adds these values to calculate the address of the data cache memory [as shown at (106) in FIG. 11]. The subsequent stages [as shown at (104) and (107) of FIG. 11] will be described together with the operations of the modified register M.

When the operand decoder I1 indicates the aforementioned modified register M contained in the functional register E3, the select control signal S3 selects the displacement disp as the output of the selector E1 and feeds the displacement disp to one input of the adder E2. The data of that modified register, selected by the register select control signal S7, is inputted to the other input of the adder E2 through the internal bus B1 [as shown at (103) and (105) in FIG. 11]. At the operation stage, the adder E2 adds the data of the modified register M and the displacement disp [as shown at (108) in FIG. 11]. At the register write/memory store stage, moreover, the added data is written back to the modified register M through the internal bus B5 [as shown at (109) in FIG. 11]. When the value of the modified register M is to be used at the subsequent stage, it is detected by the control block I4, and the bypassing driver DV0 or DV1 is enabled by the control signal S4 or S5 so that the output value of the adder E2 is directly outputted to the source bus B1 [as shown at (110) in FIG. 11]. On the other hand, the data read from the modified register M is further sent to the preshifter E7 through the internal bus B1. At this time, the control block I4 decides whether the corresponding displacement disp is negative, 0 or positive. The control block I4 further decides whether the instruction specified in the operation code is the LOAD instruction, on the basis of the decoded result of the operation code I2. Then, the control block I4 outputs the control signal S1 to the preshifter E7 based on the decided result of that displacement disp and the decided result of the aforementioned instruction. The preshifter E7 feeds one input of the arithmetic logic unit E9 with the data read from the modified register M. When the decoded result of the instruction is the LOAD instruction, the preshifter E7 selects the value 0, if the displacement disp is positive or 0. If the displacement disp is negative, the preshifter S7 feeds the selected one to the other input of the arithmetic logic unit E9. Incidentally, when the instruction decoded by the operation code decoder I2 is the LOAD instruction and in case the register number decoded by the operand decoder I1 is other than the modified register M, the preshifter E7 selects data according to the addressing kind (i.e., the data of the source bus B1 if at the index addressing time but the displacement disp if at the displacement addressing time) and feeds the selected data to the arithmetic logic unit E9. At the operation stage, the address of the data cache memory 4 is calculated such that the arithmetic logic unit E9 adds the data read from the modified register M and the displacement disp or the value 0 [as shown at (106) in FIG. 11]. This address calculation realizes the application of FIG. 4. Specifically, the output value of the arithmetic logic unit E9 becomes the value "M'+disp", when the displacement disp is negative. The output value becomes value "M'", when the displacement is positive or 0, if the read data of the modified register M is designated at M'. These contents are identical to the memory access address of the application. The address calculated by the address logic unit E9 is sent to the address bus B4 so that the data is outputted as the read data from the data cache memory 4 to the mask circuit E5 [as shown at (104) in FIG. 11]. At the register write/memory store stage, the mask circuit E5 is controlled by the control signal S6. When the destination obtained by the decoding of the target decoder I3 is an operating register other than the general purpose register E8 and the alignment register, the mask circuit E5 writes the aforementioned read data to the aforementioned destination register without executing the alignment. If the destination is the alignment register AL0, on the contrary, the mask circuit E5 subjects the aforementioned read data to the alignment of the mask pattern corresponding to the register AL0 and writes the data to the alignment register AL0 or the register other than the alignment register AL0 as an intermediate buffer [as shown at (107) in FIG. 11].

When decoder I1 indicates the modified index register Mi, the control signal S3 selects the source bus B1 as the output of the selector E1 so that the adder E2 adds the data of the modified index register Mi and the data of an arbitrary register at the operation stage. The subsequent operations are similar to those of the increment register In.

When the register number decoded (in the instruction decode stage) indicates the carry/borrow register C/B, the control block I4 detects the register number and selects the data of the carry/borrow value PSW[C/B] of the previous operation as the carry input of the least significant bit of the arithmetic logic unit E9 by the control signal S2 [as shown at (18) in FIG. 12]. In the arithmetic stage, the arithmetic logic unit E9 adds the two data and the data of the PSW[C/B] [as shown at (19) in FIG. 12]. The added result is written to the carry/borrow register C/B through the internal bus B2 [as shown at (20) in FIG. 12]. Incidentally, when the destination for the data be written to is other than the carry/borrow register C/B, the value 0 is selected as the output of the selector E6.

Figure 13:
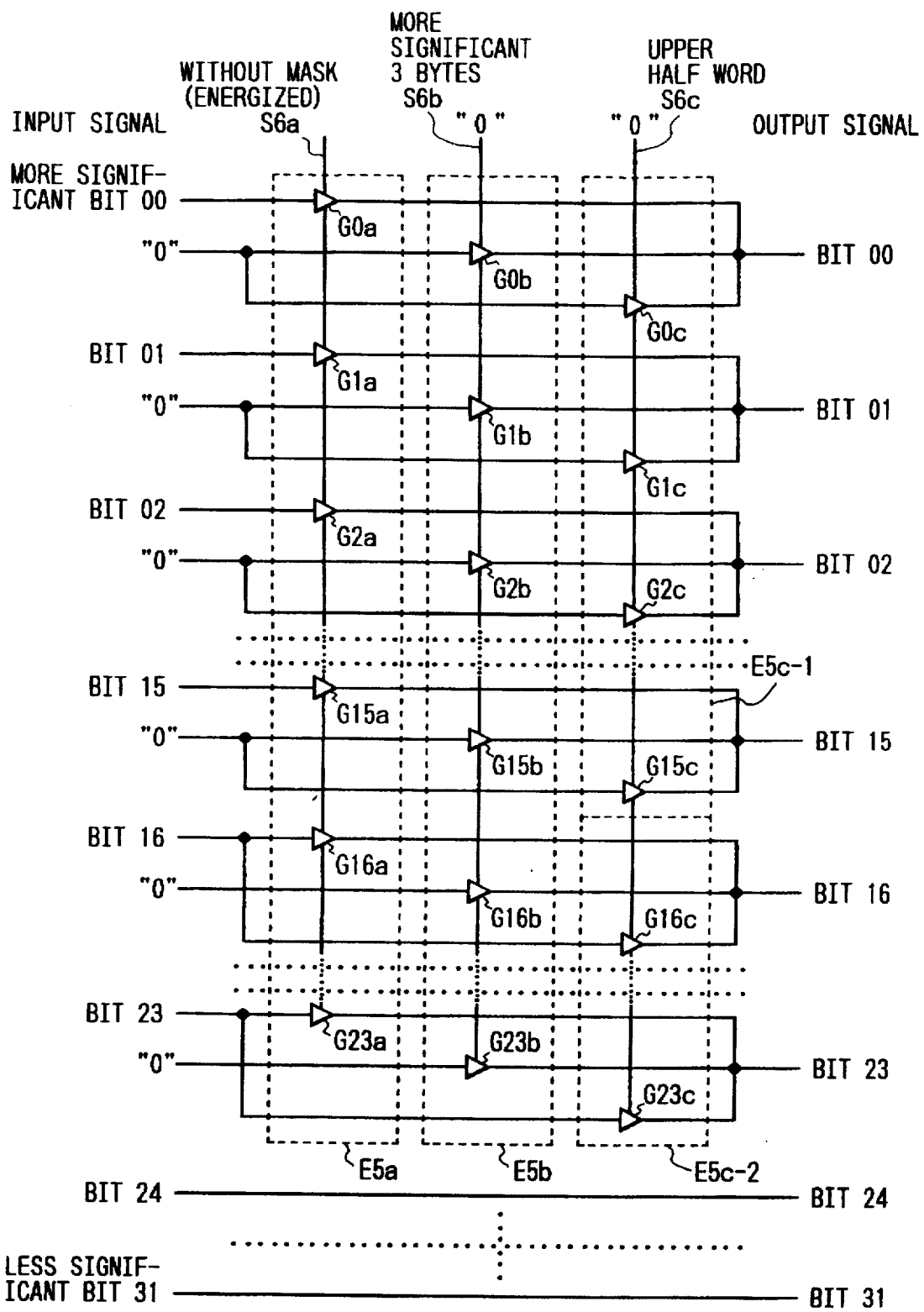
FIG. 13 is a circuit diagram showing one example of a mask circuit.

FIG. 13 shows one example of the aforementioned mask circuit E5. Incidentally, reference characters S6a to S6c appearing in FIG. 13 designate the control signals contained in the aforementioned control signal S6, and characters G0a to G23a, G1b to G23b, and G0c to G23c designate the gate circuits to be individually controlled by the control signals S6a to S6c. The example shown in FIG. 13 corresponds to the case in which: the register takes a maximum 32 bits; the input is outputted without being masked in which the input is outputted while having its more significant 3 bytes (i.e., bit 00 to bit 23) masked, and; the input is outputted while having its more significant half word (i.e., bit 00 to bit 16) masked. These modes are individually selected by the control signals S6a, S6b and S6c. In other words, the bits 24 to 31 have through signal passages from the input to the output. The bits 00 to 23 have signal passages through the inputs are selectively transmitted to the outputs through the gate circuits G0a to G23a controlled by the control signal S6a, as shown in the area E5a. Logic value "0" is selectively transmitted to the outputs through the gate circuits G0b to G23b controlled by the control signal S6b, as shown in the area E5b. The bits 00 to 23 have signal passages through which the logic value "0" are selectively transmitted to the outputs through the gate circuits G0c to G15c controlled by the control signal S6c, as shown in the area E5c-1. The inputs are selectively transmitted through the gate circuits G16c to G23c controlled by the control signal S6, as shown in the area E5c-2. The aforementioned individual gate circuits are constructed to include three-state output circuits such as clocked inverters, although not especially limited thereto.

When the alignment registers AL0 and AL1 are not specified as the target registers (i.e., at an ordinary time), only the control signal S6a is asserted to turn On the gate circuits G0a to G23a, so that the input signals are outputted as they are to the corresponding bits. When the alignment register AL0 or AL1 having the mask pattern having its less significant bit at "1", is selected as the target register, only the control signal S6b is asserted to turn ON the gate circuit G0b to G23b, so that the less significant 1 byte of the input signal is outputted to the corresponding bit whereas the value "0" is outputted to the remaining more significant 3 bytes. When the alignment register AL1 or AL0 having the mask pattern having only its less significant half word at "1", is selected as the target register, only the control signal S6c is asserted to turn ON the gate circuits G0c to G23c, so that the less significant half word of the input signal is outputted to the corresponding bit whereas the value "0" is outputted to the remaining more significant half word.

Figure 14:
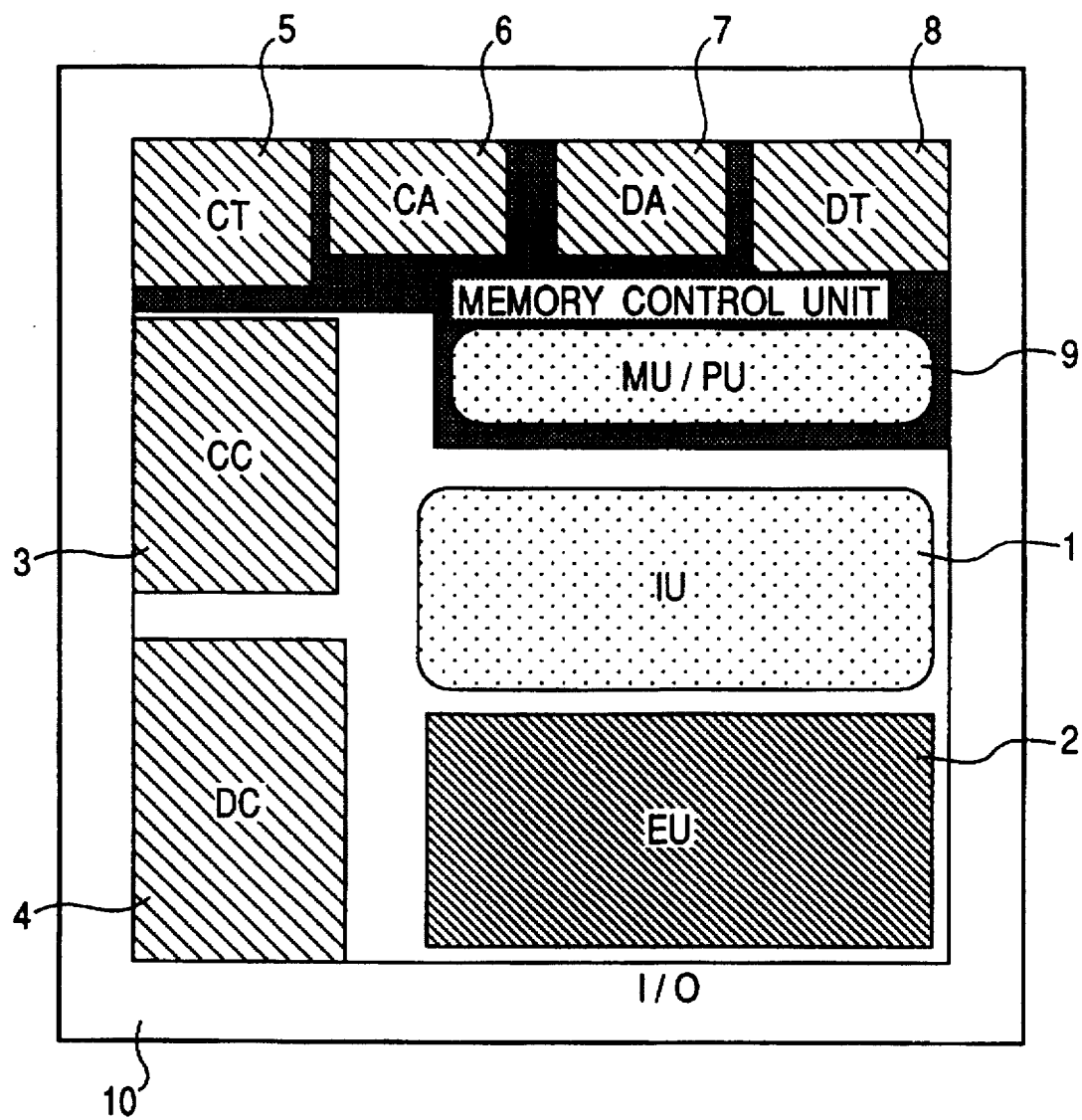
FIG. 14 is a top plan view showing a chip of the data processor shown in FIG. 9.

FIG. 14 schematically shows a top plan view of a chip of the data processor shown in FIG. 9. In the same FIG. 1 reference numeral 3 designates the instruction cache memory (CC), numeral 4 the data cache memory (DC), numeral 2 the operation unit (EU), numeral 1 the instruction control unit (IU), numeral 9 a memory controlling random logic (MU) and a system bus control unit (PU), numeral 6 an instruction tag cache memory (CA), numeral 7 a data tag cache memory (DC), numeral 5 an instruction address conversion buffer (CT), numeral 8 a data address conversion buffer (DT), and numeral 10 an input/output unit (I/O).

Figure 15:
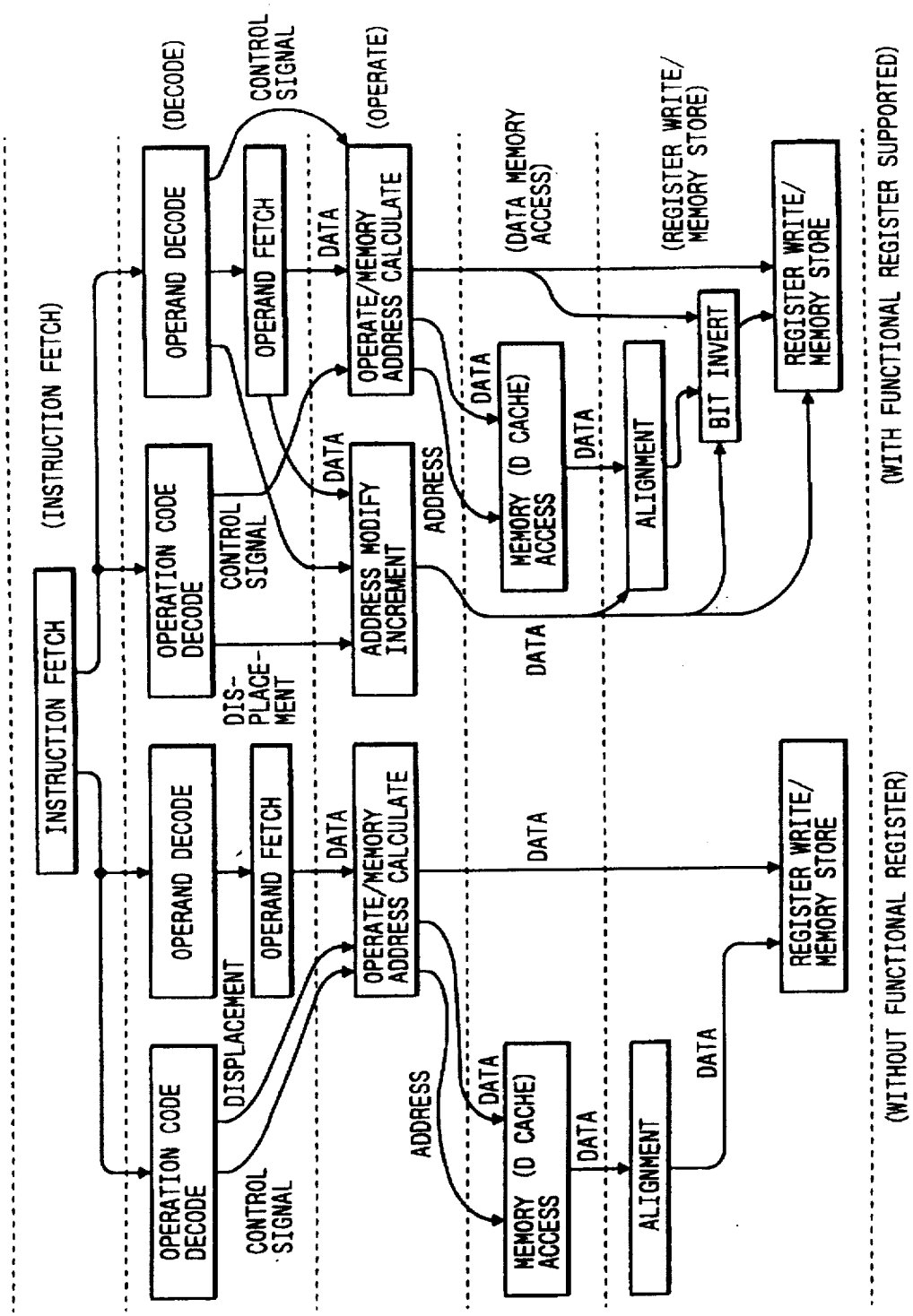
FIG. 15 is a flow chart showing one example of the operations of a data processor having no functional register and the data processor according to the present invention separately by pipe line stages.

FIG. 15 shows the flow chart of the operations for the data processor with no functional register and the data processor with the functional registers according to the present invention. Horizontal dashed lines represent pipe line stages. With no functional register, an instruction is fetched in an instruction fetch cycle from the instruction cache memory 3 of FIG. 9, the operation code and the operand of an instruction are decoded and executed to send the content of the register indicated by the operand from the general purpose register to the arithmetic logic unit. In the operation cycle, the operation corresponding to the operation code, is executed by the arithmetic logic unit using the content of the register. If the instructed operation is the LOAD or STORE, the address of the memory to be accessed and the data to be written (at the STORE time) are sent to the data cache memory in the subsequent memory access cycle. In the register write/memory store cycle, the operated data is written in the general purpose register or the data cache memory. If the instruction instructs the alignment of the data, the data is aligned and then written.

With the functional register, the address modify/increment is executed in a subsequent operation stage if the decoded operand is the increment register In, the modified register M and the increment modified register Mi. On the other hand, when the decoded operand is the shifted register ni, the data is preshifted in advance by i bits at the time of the operation/memory address.

When the alignment register AL0 or AL1 and the NOT register N are specified as the destination of the data, the data is not written before it has been subjected to the masking or bit inversion in the register write/memory store stage. On the other hand, if the destination register is the carry/borrow register C/B, the carry/borrow value is inputted to the least significant bit of the arithmetic logic unit E9 at the operation stage.

The following operations and effects can be obtained according to the embodiment thus described.

(1) In the data processor with the functional registers according to the present embodiment, the various addressing modes or composite instructions described above are executed using registers having per-designated functions. Specifically, functional registers are provided without increasing the number of instructions. The increase in the bit number in the operation code area is absorbed by the bit number in the operand area and the target area. In the data processor with no functional register, on the contrary, the instruction number is increased for CISC function by diversifying the addressing method or by adding the composite instruction having several instructions combined. As a result, the bit number of the operation code field in the instruction format is increased which enlarges the logical scale of the operation code decoder thereby elongating the instruction decoding time and reducing the operating frequency of the data processor. This difference is clearly understood from FIG. 16. The data processor of the present embodiment does not increase the bit number of the operation code area nor the logical scale of the operation code decoder when its functions are extended. In the system with no functional register, on the contrary, the bit number of the operation code area and the logical scale of the operation code decoder are seriously increased.

(2) Moreover, since the various functions can be realized by combining the operation codes and the functional registers, one function register can be used, if provided, in combination with a plurality of instructions or operation codes to realize a plurality of functions. If the load and increment functions, the increment function, and the store and increment functions are to be added, the corresponding instructions or operation codes have to be added. In the present invention, however, it is sufficient to add only one increment register. As a result, the number of functional registers to be added may be smaller than that of the functions added to the data processor, thereby reducing the bit number of the operand area and the target area. As a result, even if the data processor has its functions extended by the functional registers, it is possible to minimize the the bit number of the specified area of the instruction operand and the target and in the logical scale of the operand decoder and the target decoder.

(3) We have examined the reduction of the instructions using the operating registers of FIGS. 2 to 8. Our examinations have revealed that twenty six of the one hundred and twenty one instructions defined for the PA-RISC can be reduced using the aforementioned various functional registers. This reduction corresponds to 21% of the original instruction number.

Although our invention has been specifically described in connection with its embodiment, it should not be limited thereto. Our invention can naturally be modified in various manners without departing from the gist thereof. For example, the kinds of the functional registers should not be limited to those described with reference to FIGS. 2 to 8. Other functions can also be realized. Although our invention has been described as applied to the data processor of general purpose register type backgrounding its field of application, it should not be limited thereto. Our invention can be applied to a data processor of accumulator type. Moreover, general purpose registers can be eliminated.

The effects to be obtained from the representative of the invention disclosed herein will be briefly described in the following.

(1) A function is allocated in advance to a predetermined register (i.e., functional register) to specify the functional register in an instruction. As a result, the data can be subjected to the various data processing steps which are a combination of the instructions specified by the operation code and the specific functions owned allocated to functional registers. In other words, it is possible to realize the functions similar to the processings by the various addressing modes and the composite instructions while suppressing the increase in the instruction number.

(2) Since the various data processings are realized by combining the processings of the instruction specified by the operation codes and the specified functions allocated to the functional registers, the processings by the data processor can be diversified and given multiple functions without increasing the instruction number of the instruction set, i.e., without increasing the bit number of the operation code, so that the various functions can be realized with little increase in the hardware of the instruction control part represented by the decode logic of the operation code. As a result, the logical scale of the random logic, such as the instruction decoder of the instruction control part, is minimized while enhancing the performance of an LSI.

(3) The aforementioned various functions are executed by specifying the functional registers in the operand specifying area in the instructions. The pre-defined functions allocated to the functional registers, are executed at the time of writing and reading the data to and from the corresponding registers. As a result, the number of instructions is not increased as the functions are extended. This means that the highly functional processings can be realized with a smaller number of steps.

(4) Since the various functions can be realized by combining the operation codes and the functional registers, one function register can be used in combination with a plurality of instructions or operation codes to realize a plurality of functions. As a result, the number of the functional registers to be added can be smaller than the number of functions added to the data processor, so that the bit number in the operand area and in the target area is minimized. As a result, even if the functions of The data processor are extended by the functional registers, it is possible to minimize the bit number of the operand or target specifying areas of the instructions and the logical scales of the operand decoders and the target decoders.

What is claimed is:

1. A data processor for executing processing procedures responsive to instructions which include single instructions each having (i) an operation code portion and (ii) a specifying data portion, the data processor comprising:

a plurality of function registers each of which is dedicated to a pre-defined processing procedure, the pre-defined processing procedures being different from each other, at least one of the function registers being specified by the specifying data portion of a single instruction;

accessing means responsive to the specifying data portion of the single instruction for accessing the function register;

processing means responsive, independent of the operational code portion, to one of (i) a write access for writing write data to the function register and (ii) a read access for reading read data from the function register, for executing the pre-defined processing procedure which is dedicated to the specified function register for one of the write data to be written to the function register and the read data to be read from the function register.

2. The data processor according to claim 1, wherein said processing means includes means for executing an additional processing procedure according to the operation code portion of said single instruction, in addition to the execution of the predefined processing procedure dedicated to the function register specified by the specifying data portion of said single instruction.

3. The data processor according to claim 2, wherein said processing means includes means responsive to one of a write access or a read access for one of the plurality of function registers for executing the corresponding dedicated, pre-defined processing procedure.

4. The data processor according to claim 1, wherein said processing means includes means responsive to one of a write access or a read access of one of the plurality of function registers for executing the dedicated, pre-defined processing procedure for the corresponding one of the write data written to the one function register or the read data read from the one function register.

5. A data processing method for executing a processing procedure in response to a single instruction having an operation code and specifying data for specifying one function register from a plurality of function registers, the function registers each being dedicated to one of a plurality of pre-defined processing procedures, the method comprising:

a) independent of the operation code, executing a pre-defined processing procedure dedicated to a one of the plurality of function registers which one function register is specified by the specifying data of the single instruction, for one of write data to be written to the function register and read data to be read from the function register; and b) executing a processing procedure specified by said operation code of the single instruction.

6. The data processing method according to claim 5, wherein said step a) includes:

a1) a step of reading the read data from said function register; and a2) a step of executing the pre-defined first processing procedure dedicated to said function register for the read data.

7. The data processing method according to claim 6, wherein said step b) includes:

b1) the step of executing said processing procedure for data after the pre-defined processing procedure to said function register has been executed.

8. A data processing method according to claim 5, wherein said step b) includes:

b1) the executing step of executing the second processing procedure specified by said operation code for one of the write data for which the pre-defined first processing procedure has not been executed or the read data for which the pre-defined first processing procedure has been executed.

9. A data processing method according to claim 8, wherein said step b) includes:

b2) the step of writing data to said function register after the processing procedure has been executed.

10. The data processing method according to claim 5, wherein said step a) includes:

a1) a step of executing the pre-defined first processing procedure dedicated to said function register for the write data; and a2) a step of writing the write data to said function register.

11. In a data processor comprising an instruction control part and an execution part for executing an instruction under control of the instruction control part, the instruction having (i) an operation code and (ii) a specifying data portion, said executing part comprising:

a plurality of general purpose registers, and a plurality of function registers each of which is dedicated to a pre-defined processing procedure which is executed with one of write data written thereto and read data read therefrom, the pre-defined processing procedure which is dedicated to a one of the function registers specified by the specifying data portion in the instruction and a processing procedure specified by the operation code in the instruction are both executed in response to executing the instruction which specifies the function register.

12. The data processor according to claim 11, wherein the pre-defined processing procedure dedicated to said function register inverts the write data to be written, and wherein an inverter is connected with an input of said function register.

13. The data processor according to claim 11, wherein the pre-defined processing procedure dedicated to said function register adds a predetermined constant to data which has been stored in the function register and outputs incremented data as said read data, and wherein said executing part includes: a selector for selecting and outputting the predetermined constant to be added; and an adder for adding an output of said function register with the predetermined constant and feeding the added value to an input of said function register.

14. The data processor according to claim 11, wherein the pre-defined processing procedure dedicated to said function register:

if the instruction specifies a displacement which is negative, delivers a subtraction of a displacement from data stored in the function register as read data for processing in accordance with said instruction, or if the displacement is zero or positive, updates the data stored in the function register by adding the displacement to the stored data.

15. The data processor according to claim 11, wherein the dedicated processing procedure dedicated to said function latches a logical AND between the write data and a mask pattern.

16. The data processor according to claim 11, wherein the pre-defined processing procedure dedicated to said function register adds a value of a bit indicating a carry or borrow status of a program status word to data to be written therein and writes the added data to the function register.

17. The data processor according to claim 11, wherein the pre-defined processing procedure dedicated to said function register shifts data stored in the function register a predetermined bit in a predetermined direction.

18. A data processing method for processing data in accordance with an instruction having an operation code portion and an information portion specifying one register from a plurality of registers to be utilized in a processing procedure specified by the operation code portion, the method comprising:

the step of subjecting data stored in a one of the plurality of registers specified by the information portion of the instruction to a pre-defined inherent operation dedicated to the register which is specified in the information portion of the instruction the plurality of registers each being dedicated to its own pre-defined inherent operation; and the step of delivering a result of the predefined inherent operation as read data from said register for processing specified by the operation code portion.

19. A data processing method according to claim 18, further comprising:

the step of writing back the delivered read data to said register after said delivery step.

20. A data processing method for processing data in accordance with an instruction having an operation code and an information specifying a register from a plurality of registers which register is to be utilized in a processing procedure specified by the operation code, the method comprising:

the step of subjecting data to be written to a one of the plurality of registers specified by the information of said instruction to a pre-defined inherent operation dedicated to the one of the registers which is specified by the information of the instruction, each of the registers being dedicated to one of a plurality of pre-defined individual inherent operations; and the step of writing a result of the pre-defined inherent operation to said register as write data.

21. The data processing method according to claim 20, wherein said specifying information includes an information for selecting said register having the pre-defined inherent operation dedicated thereto from a plurality of general purpose registers.

22. A data processor which executes a processing procedures in accordance with an instruction having (i) an operation code for specifying one of the processing procedure and (ii) information specifying a register to be utilized in the processing procedure specified by the operation code, the data processor comprising:

an instruction control part which controls application of stored data in one of a plurality of function registers which is specified by the specifying information to one of a plurality of inherent operations to which the one function register specified in the instruction is dedicated, the plurality of function registers each being dedicated to a pre-defined inherent operation;

an execution part which executes the dedicated pre-defined inherent operation with the stored data and delivers result of the inherent operation as read data from said function register for the processing procedure specified by the operation code.

23. The data processor according to claim 22, wherein the instruction control part writes the delivered read data to said specified function register.

24. A data processor which executes processing procedures in accordance with instructions, each having (i) an operation code for specifying one of the processing procedures and (ii) information specifying a register to be utilized in the specified processing procedure, the data processor comprising:

an instruction control part which controls application of write data to be written to a function register specified by the specifying information to a pre-defined inherent operation dedicated to the specified function register, the specified function register being one of a plurality of function registers each of which is dedicated to a pre-defined inherent operation; and an execution part which executes the dedicated pre-defined inherent operation to the write data and writes an operation result to said specified function register.

* * * * *